United States Patent [19]

Thompson

[11] 4,246,776
[45] Jan. 27, 1981

[54] LEAK SCOPE FOR DETECTING LEAKS IN PLUMBING EQUIPMENT

[76] Inventor: Cornell Thompson, 5927 Third St., Washington, D.C. 20011

[21] Appl. No.: 78,726

[22] Filed: Sep. 25, 1979

[51] Int. Cl.³ .......................... A61B 7/02; G01M 3/24
[52] U.S. Cl. .............................. 73/40.5 A; 179/1 ST; 181/135
[58] Field of Search .................... 73/40.5 A; 181/131, 181/128; 128/715, 773; 179/1 ST

[56] References Cited

U.S. PATENT DOCUMENTS

| | | | |
|---|---|---|---|
| 612,761 | 10/1898 | Wiggin | 181/128 |
| 1,140,827 | 5/1915 | Hoppie | 128/715 X |
| 2,230,794 | 2/1941 | Danischewsky | 181/131 |
| 2,261,375 | 11/1941 | Jacobs | 181/131 X |
| 2,389,868 | 11/1945 | Olson | 181/131 |
| 2,715,296 | 8/1955 | Pettit | 181/131 X |
| 2,755,880 | 7/1956 | Hofmann | 181/131 |
| 3,458,656 | 7/1969 | Sewerin | 73/40.5 A |
| 4,176,660 | 12/1979 | Mylrea et al. | 128/715 X |

FOREIGN PATENT DOCUMENTS 69717  8/1915  Austria ...................................... 181/131

*Primary Examiner*—Daniel M. Yasich
*Attorney, Agent, or Firm*—Eric P. Schellin; Joseph P. Nigon

[57] ABSTRACT

A sturdy, portable apparatus for detecting water leaks in plumbing equipment consisting of an elongated rod having two upstanding portions and a third portion bent at a 90° angle to the upstanding portions with tubes connecting the upstanding portions to ear pieces, the tubes containing a plurality of wires positioned in close proximity to the upstanding portions of the rod and extending in close proximity to the ear pieces. Leakage of water sets up acoustical vibrations which are transmitted through the metal rod and are picked up by the wires and transmitted to the ear pieces.

4 Claims, 5 Drawing Figures

LEAK SCOPE FOR DETECTING LEAKS IN PLUMBING EQUIPMENT

BACKGROUND OF THE INVENTION

There has been a need for a sturdy, portable apparatus that can be used by employees of water companies to check for leaks in residential and commercial plumbing systems, particularly flush toilets. The instant device fills this need as it consists of a minimum number of parts and does not contain a diaphragm. The device can be used to detect leaks in household toilets of a tank type or even toilets using Sloan valves to control the flow of water into the bowl. The prior art devices of this type utilize diaphragms as part of their structure. U.S. Pat. No. 2,755,880 to Hofmann discloses an acoustic device in which vibrations of a diaphragm caused by vibrations in a water pipe are transmitted through a tube to ear pieces. U.S. Pat. No. 2,389,868 to Olson discloses an acoustic stethoscope that not only utilizes a diaphragm but also relies on an electric circuit. U.S. Pat. No. 2,261,375 to Jacobs discloses an apparatus for determining the characteristics of a lake bed or the like in which a line connects a metal device, designed to sink to the bottom of the lake, with an acoustical diaphragm that is connected to means for transmitting sound vibrations to earphones. U.S. Pat. No. 3,458,656 to Sewerin discloses an apparatus for localizing water leakage that utilizes a geophone and an electric circuit.

SUMMARY OF THE INVENTION

The present invention relates to a device for detecting leaks in plumbing systems, particularly leaks in toilets. The device is sturdy, reliable and readily portable. The device consists of an elongated rod having two upstanding portions and a third portion positioned at a 90° angle to the upstanding portions. Flexible tubes connect the upstanding portions of the rod to tubes attached to the ear pieces of the device. A plurality of wires extend from a position in close proximity to the upstanding portions of the metal rod to close proximity to the ear pieces to transmit the acoustical vibrations picked up by the third portion of a metal rod to the ear pieces so that the user can detect water leaks in the plumbing system. Thus the instant device is capable of detecting sound vibrations in a restricted area of plumbing equipment.

DETAILED DESCRIPTION OF THE INVENTION

Figure 1:
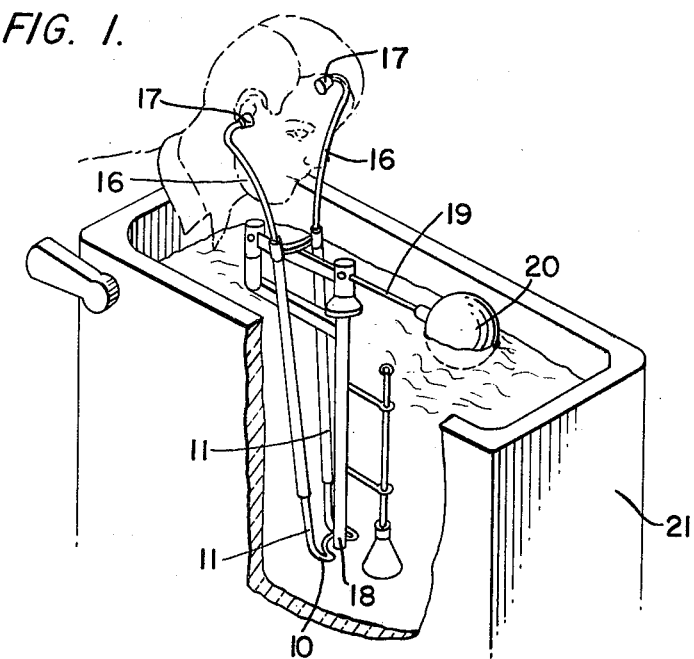
FIG. 1 shows the device in use in detecting leaks in a tank type residential toilet.

FIG. 1 shows the device in use in detecting possible leakage in a toilet of the tank type. The lower portion 10 of the upstanding metal rods 11 is positioned around the pipe 18 containing the mechanism (not shown) of the ball cock valve controlled by the float 20 through the rod at 19 for admitting water into the tank 21. Any defect in the ball cock valve mechanism can be detected through the device because even a very small flow of water will set up acoustical vibrations which will be transmitted from the portion 10 of the device through the upstanding members 11 to the ear pieces 17.

Figure 2:
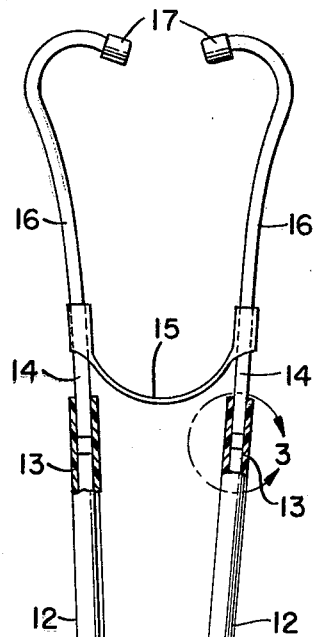
FIG. 2 is a front elevation view of the device.

Referring now to FIG. 2, the device consists of a metal rod having two upstanding portions 11 with a third portion 10 positioned at a right angle to the upstanding members 11. The upstanding members 11 are partially covered by elastic members 12 which extend over the portion 13 connecting the upstanding members 11 with the lower portions of the listening tubes 14. The lower portions of the listening tubes are connected by a spring bowl 15. The upper portions 16 of the listening tubes are equipped with ear pieces 17 in a manner such that the two listening tubes can be applied to two sides of the head to the user and by means of the spring bowl 15 are kept resiliently resting with ear pieces 17 on the ears of the user.

Figure 3:
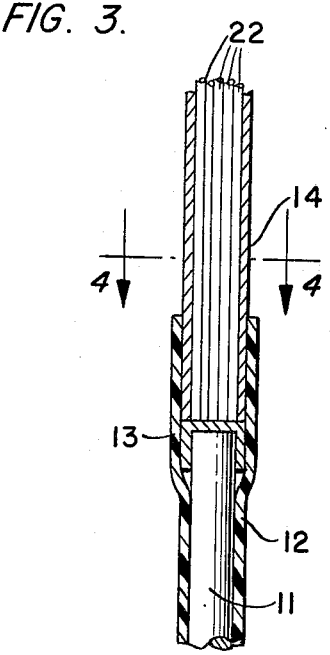
FIG. 3 is an enlarged sectional view taken along line 3 of FIG. 2.
Figure 4:
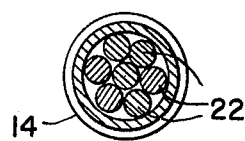
FIG. 4 is a sectional view taken along lines 4—4 of FIG. 3.

FIG. 3 is an exploded view of the portion 13 showing an essential feature of the invention. A plurality of wires 22 are positioned in the tube in close proximity to the upstanding members 11 of the rod. These wires 22 conduct the sound through the lower portion 14 and the upper portion 16 of the tube to the ear pieces 17. This feature of the device is a major improvement over the devices of the prior art in that no diaphragm is needed in the structure. If the wires 22 were not present in the portions 14 and 16 of the tube, the sound would not be transmitted to the ear pieces 17. FIG. 4 is a cross section along line 4—4 of FIG. 3 and shows the position of the wires 22 in the portions 14.

Figure 5:
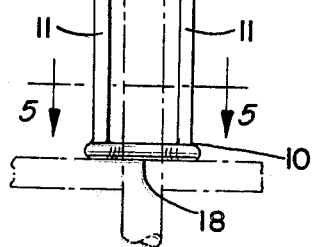
FIG. 5 is a detailed view taken along lines 5—5 of FIG. 2.
Figure 5:
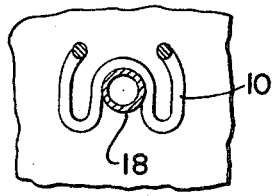

FIG. 5 is a view taken along line 5—5 of FIG. 2 and shows a preferred embodiment of the invention. This embodiment is designed particularly for use with tank type toilet structures. It shows the portion 10 of the rod that is positioned at a 90° angle to the upstanding members 11 having a U-shaped configuration so that it will fit easily about the pipe 18 containing the control mechanism for the ball cock valve.

Although this is a preferred embodiment of the invention, it is obvious that the device can be modified by eliminating the U-shaped configuration of the element 10. Any configuration where the element 10 would rest flat on a surface would be adequate when the device is used to detect leaks in a Sloan tank arrangement of a conventional toilet system.

In use, the engineer places the ear pieces 17 on his ears and positions the device in the bottom of the tank in a manner such that the semi-circular element 10 fits around the pipe 18 that contains the control mechanism for the ball cock valve. If there is even a slight leakage of water past this valve, acoustical vibrations are set up which are transmitted through the upstanding portions 11 of the rod through the wires 22 to the ear pieces 17. This allows the engineer to point out to the homeowner that there is a water leakage problem in the toilet where such a leakage exists.

Although my leak scope is described as a device for detecting leaks in toilet systems, it is obvious that the device can be modified and used to detect vibrations in shafts, leaks in valves in liquid-containing pipelines, etc.

What is claimed is:

1. An apparatus for detecting water leaks in plumbing equipment by sound transmission, the combination comprising:

(a) an elongated metal rod having two upstanding portions and a third portion formed at substantially a 90° angle to said upstanding portions, said third portion arcuately shaped so as to be more easily positioned around a pipe so as to detect sound vibrations in a restricted area in said plumbing equipment, said rod operably connected to (b) means for transmitting said sound vibrations to the ear, said transmitting means comprising tubes connecting an end of each of said upstanding portions of said metal rod to ear pieces, said tubes containing a plurality of wires for transmitting the sound vibrations to the car, said wires positioned in a lower portion of each of the tubes in close proximity to the upstanding portions of said rod to which said tubes are attached.

2. The apparatus according to claim 1 wherein said wires extend essentially the entire distance between said upstanding portions and said rod and said ear pieces.

3. The apparatus according to claim 2 wherein said upstanding portions and said rod are connected by means of two separate tubes to upper portions of each of the tubes connected to the ear pieces.

4. The apparatus according to claim 1 wherein said third portion of said metal rod has a U-shaped configuration.

* * * * *